United States Patent
Choplin (10) Patent No.: US 11,332,336 B2
(45) Date of Patent: May 17, 2022

(54) FEED FOR PLASTIC-WRAPPING

(71) Applicant: SIDEL PACKING SOLUTIONS, Corcelles-les-Citeaux (FR)

(72) Inventor: Gregory Choplin, Corcelles-les-Citeaux (FR)

(*) Notice: Subject to any disclaimer, the term of this patent is extended or adjusted under 35 U.S.C. 154(b) by 460 days.

(21) Appl. No.: 15/281,983

(22) Filed: Sep. 30, 2016

(65) Prior Publication Data

US 2017/0096313 A1    Apr. 6, 2017

(30) Foreign Application Priority Data

Oct. 1, 2015    (FR) ...................................... 1559319

(51) Int. Cl.
*B65H 19/00*    (2006.01)
*B65H 19/18*    (2006.01)
*B29C 65/00*    (2006.01)
*B65B 41/12*    (2006.01)
*B29C 65/18*    (2006.01)

(52) U.S. Cl.
CPC .......... *B65H 19/1805* (2013.01); *B29C 65/18* (2013.01); *B29C 66/43* (2013.01); *B65B 41/12* (2013.01); *B65H 19/1852* (2013.01); *B65H 19/1873* (2013.01); *B65H 2301/4634* (2013.01); *B65H 2701/1944* (2013.01); *B65H 2801/81* (2013.01)

(58) Field of Classification Search
CPC ......................... B65H 19/1852; B65H 19/1873
USPC ......................................................... 156/504
See application file for complete search history.

(56) References Cited

U.S. PATENT DOCUMENTS

| | | | | |
|---|---|---|---|---|
| 2,581,711 A * | 1/1952 | Roselius | ............ | B65H 19/1852 242/563.2 |
| 3,252,671 A * | 5/1966 | Phillips, Jr. | ........ | B65H 19/1836 242/553 |
| 4,009,841 A * | 3/1977 | Matalia | .............. | B65H 19/1815 242/555.6 |
| 4,082,599 A * | 4/1978 | Kozima | ............. | B65H 19/1836 156/504 |
| 4,170,506 A * | 10/1979 | Marschke | .......... | B65H 19/1852 156/159 |

(Continued)

FOREIGN PATENT DOCUMENTS

| CA | 2021164 A1 | 1/1991 |
|---|---|---|
| DE | 10 2004 032528 B3 | 8/2005 |

(Continued)

OTHER PUBLICATIONS

French Search Report, dated Aug. 15, 2016, from corresponding French Application.

*Primary Examiner* — Eyamindae C Jallow (57) ABSTRACT

A device (1) for delivery of film for a station for packaging by plastic-wrapping, includes: at least two reels (2), each including at least one support shaft (3) for a film roll as well as a film guide (4), in particular in the form of a roller downstream from the shaft; a return roller (5), up to which an unwound film (6) travels from the roll of one of the reels (2); a loader for bringing the reserve film (9) from the roll of the at least one other reel (2) close to the unwound film. The loader includes a rotor (10), which rolls up the reserve film (9) around it in such a way as to bring it close to the unwound film (6). A machine that uses this device as well as a corresponding method are also described.

13 Claims, 5 Drawing Sheets

(56) References Cited

U.S. PATENT DOCUMENTS

| | | | | |
|---|---|---|---|---|
| 5,765,336 | A * | 6/1998 | Neagle | B65B 5/026 |
| | | | | 53/201 |
| 6,161,793 | A * | 12/2000 | Lindstrand | B65H 19/1852 |
| | | | | 242/556 |
| 6,325,324 | B1 * | 12/2001 | Getz | B65H 19/1852 |
| | | | | 242/555.2 |
| 9,782,927 | B2 * | 10/2017 | Hansen | B29C 65/1654 |
| 2002/0060266 | A1 * | 5/2002 | Lintelmann | B65H 19/1852 |
| | | | | 242/560 |
| 2006/0026926 | A1 * | 2/2006 | Triel | B65B 41/12 |
| | | | | 53/399 |
| 2008/0092493 | A1 | 4/2008 | Mace et al. | |
| 2014/0311654 | A1 | 10/2014 | Hansen et al. | |

FOREIGN PATENT DOCUMENTS

| | | |
|---|---|---|
| DE | 10 2011 111786 A1 | 3/2013 |
| EP | 1 600 412 A1 | 11/2005 |
| EP | 1 379 457 B1 | 4/2006 |
| FR | 2 198 476 A5 | 3/1974 |
| GB | 1 417 972 A | 12/1975 |
| WO | 2010/121252 A2 | 10/2010 |

\* cited by examiner

FEED FOR PLASTIC-WRAPPING

FIELD OF THE INVENTION

This invention relates to the field of machines for packaging by plastic-wrapping and has as its object, on the one hand, a device for delivery of film, and, on the other hand, a method using this device, as well as a machine in which such a device is mounted.

BACKGROUND OF THE INVENTION

EP1379457 discloses, for example, a method for swapping-out a feed roll, in which a new film is engaged upon detection of the end of the unwound roll.

In the field of the swapping-out of rolls, GB 1417972, which proposes a delivery device that can swap out between an unwound roll and a reserve roll using a rotary structure equipped with a pair of rollers between which the two films are placed, is also known. An adhesive is placed in advance on the reserve film, making it possible to hook up the two films. Thus, the driving of the old film into the machine brings with it the new film, which ensures the continuity of the process.

For the automatic swapping-out between an unwound roll and a reserve roll, WO2010/121252 proposes a tensioning roller against which the unwound film is rolled up after having separated the roll from the part of the film taken into the machine. The tensioning roller is then unrolled against the reserve roll, then connecting, thanks to an adhesive provided in advance, the reserve film with the unwound film held on the tensioning roller. One of the drawbacks of this principle is that it modifies the state of the film downstream from the swapping-out, since it makes it necessary to roll up a part of it on the tensioning roller.

CA2021164 proposes carrying out the swapping-out between an unwound roll and a reserve roll by using two counter-rotating central rollers, on which a film is received each time. The films are glued against one another in the area of these rollers thanks to a corresponding nozzle. One of the drawbacks of this operating principle is in particular that it is not possible to be extended to more than two rolls, which therefore limits the autonomy of the machine.

Finally, EP1600412, which proposes a principle based on a loading bar, which can move transversely toward the welding station between, on the one hand, the reserve roll and the end of the reserve film, is also known. The two films are then welded, against the loading bar. This embodiment is, however, cumbersome, since it is necessary to create the movement of the loading bar. In addition, the attachment of the reserve film changes in each cycle, which can cause handling errors.

In the face of this state of the art, there is therefore a need today to improve the machines for packaging by plastic-wrapping at least in the area of the approach of the automated swapping-out of rolls, between the unwound roll and a reserve roll.

SUMMARY OF THE INVENTION

The purpose of the invention is thus to propose a swapping-out of the roll that is as simple, fast and ergonomic as possible for the operator, and/or compact.

To do this, the invention proposes, for bringing the films to be connected closer together, moving the reserve film up to the film in the process of being distributed thanks to a rotational motion of a rotor initially at the top from which the end of the new film is held.

The invention thus has as its object a device for delivery of film for packaging products by plastic-wrapping, with said device comprising at least two reels, each comprising at least one support shaft for a film roll as well as a film guide, a return roller, up to which, during operation, a film, a so-called unwound film, travels, from a roll of one of the reels, a so-called unwound roll; a loader, for bringing the film, called reserve film, from one roll of the at least one other reel, so-called reserve roll, close to the unwound film.

This device is characterized in that the loader comprises a rotor, which rolls up the reserve film around it in such a way as to bring it close to the unwound film.

The invention also has as its object a machine in which this device is mounted, namely a machine for packaging by plastic-wrapping, comprising a belt conveyor on which there are products to be coated, a coating module within which the products are coated with film, as well as a thermal contraction furnace into which the coated products subsequently travel, where said machine comprises, for its feed of film, a delivery device as described above.

The invention also has as its object a method implemented by this device, namely a method for delivery of film from a machine for packaging by plastic-wrapping, said method comprising steps essentially consisting in sending against a return roller a film, a so-called unwound film, from a roll, a so-called unwound roll, swapping out a roll for continuing to deliver a film from another roll, heretofore a reserve roll, and, for this purpose, stopping the unwound film and connecting it to the film, so-called reserve film, from said reserve roll.

This method is characterized in that it comprises a loading step that essentially consists in rotating a rotor on the periphery of which is held an end part of the reserve film, in such a way as to roll up the reserve film around said rotor and then to bring it close to the unwound film to connect them.

BRIEF DESCRIPTION OF THE DRAWINGS

The invention will be better understood thanks to the description below, which is based on possible embodiments, explained in a way that is illustrative and in no way limiting, with reference to the accompanying figures, in which.

DETAILED DESCRIPTION OF THE INVENTION

The invention therefore first of all has as its object a device 1 for delivery of film for packaging products by plastic-wrapping, said device comprising At least two reels 2, each comprising at least one support shaft 3 for a film roll as well as a film guide 4, A return roller 5, up to which, during operation, a film, a so-called unwound film 6, travels, from a roll of one of the reels 2, a so-called unwound roll 7;

A loader, for bringing the film, a so-called reserve film 8, from one roll of the at least one other reel 2, a so-called reserve roll 9, close to the unwound film 6, in particular for the purpose of connecting the reserve film 8 to the unwound film 6.

The delivery device 1 therefore brings the film that is necessary to a plastic-wrapping of products, of the bottle type, organized into lots, in other words to a coating of lots of products using film. This film is located on a roll guided in rotation, and is pulled downstream by a traction module 15. The delivery device 1 therefore feeds the plastic-wrapping machine with a film roll, then a so-called unwound roll 7. So as to ensure greater autonomy, the delivery device 1 can also accommodate another roll, that is, the so-called reserve roll 9, which will be connected automatically to the film in progress, for the purpose of reducing the need for an operator to intervene. In absolute terms, the delivery device 1 can be designed for receiving more than one other roll or reserve roll 9. The delivery device 1 therefore comprises at least two reels 2, one being used to support the unwound roll 7 and the at least one other being used to support another reserve roll 9. The reserve roll 9 remains in the reel 2 even when it becomes an unwound roll 7.

The delivery device 1 has a loader to which a portion of the reserve film 8, preferably a free end portion, can be attached. The loader is then used in particular to bring the reserve film 8 into the immediate environment of the unwound film 6, in the area of a welding station 12 as will be described below, so that the two are connected.

The film guide 4 takes the form in particular of a roller downstream from the support shaft 3.

According to the invention, the loader comprises a rotor 10, which rolls up the reserve film 9 around it in such a way as to bring it close to the unwound film 6, a clamp 11 or film locking means 11 being provided in particular downstream from the return roller 5 to maintain the tension on the film downstream.

It is therefore by the rotation of the rotor 10, to which a portion of the reserve film 8 is connected, that said reserve film 8 is rolled up on the periphery of said rotor 10 and that a part of the reserve film 8 is then brought close to the unwound film 6. The rotor 10 is actually such that its peripheral surface, on which the reserve film 8 is rolled up, is close to the unwound film 6, with the position of the latter depending, on the one hand, on the film guide 4, and, on the other hand, on the return roller 5 on the periphery of which it travels.

Thus, according to a possible additional characteristic, the rotor 10, the return roller 5, and the reels 2 are such that the periphery of the rotor 10, on which the reserve film 9 is rolled up, extends close to the unwound film 6, in the zone between, on the one hand, the guide 4 of the reel 2 of the unwound roll 7, and, on the other hand, the return roller 5. It is then only necessary to roll up the reserve film 9 on the rotor 10 so that said film comes close to the unwound film 6.

The guide 4 of a reel 2 is then positioned in such a way that when the roll that it carries is the unwound roll 7 and its film is then the one that is used by the coating machine, this film, so-called unwound film 6, travels close to the rotor 10 at least locally, with its path being defined by the position, on the one hand, of said guide 4, and, on the other hand, of the return roller 5.

The support shaft 3 is preferably driven in rotation by a motor controlled by the delivery device 1, optionally suitable for the reel 2. This controlled motor preferably has a means for measuring its angle of rotation, as well as the resistive torque.

In particular configurations, the at least two reels face one another, with the rotor 10, and the return roller 5, essentially opposite one another, being mounted between one another, creating in particular a triangular shape in which the rotor 10, delimited by the return roller 5 and the guide 4 of each of the two reels 2, is found. As will be presented in even more detail below, a slight offset can be provided between the rotor 10 and the return roller 5. With a rotor 10 mounted in such a central position, the unwound film 6 is always close to the rotor 10, regardless of the reel 2 that carries the unwound roll 7.

According to another possible additional characteristic, the delivery device 1 comprises, associated with each reel 2, a welding station 12, for connecting the unwound film 6 of one roll of said reel 2 to the reserve film 8 from one roll of the at least one other reel 2, where said welding station 12 comprises two jaws between which are taken the two films, with one of the jaws being formed by the periphery of the rotor 10 and the other being arranged opposite it.

During operation, the unwound film 6 extends continuously from the unwound roll 7 up to the film traction module 15 that the packaging machine comprises, the latter ensuring the traction of the unwound film 6 downstream. The principle used here is therefore of attaching the reserve film 8 to the unwound film 6, connected to the traction module 15. By then separating the unwound roll 7, the advance of the film will have the effect of first consuming the rest of the film of the old roll, and then the film of the new roll. This bond is made by welding within a welding station 12 in the area of which each of the two films are located: the reserve film 8 taking into account its presence on whose rotor 10 a portion of the periphery contributes to forming one of the jaws, and the unwound film 6 taking into account the positions of the guide 4 and the return roller 5. The two films are located between the peripheral surface of the rotor and the counter-jaw, described below.

In certain embodiments, the jaw opposite the rotor 10 takes the form of a heating sealing bar 13, movable in the direction of the rotor 10 for pressing the two films together against it. The sealing bar 13, forming a counter-jaw, is thus preferably put into motion in the direction of the rotor 10 by the controlled maneuvering of a jack-type actuator. The welding station 12 closes on the two films by the sealing bar 13 coming against the rotor 10. Heat input then makes it possible to weld the films. Quite obviously, other ways of carrying out the hooking of the reserve film 8 on the unwound film 6 are possible.

According to a possible additional characteristic, the jaw opposite the rotor 10 is interchangeable and detachable. The sealing bar 13 is then preferably mounted on a pivoting plate 18. The pivoting of the plate 18 makes it possible to release the sealing bar 13 from the environment of the rotor 10 and then to facilitate its access for an operator. This also provides the free space that is necessary for the detaching motions of the sealing bar 13, if necessary. The offset of the sealing bar 13 can actually be provided along a movement that is perpendicular to the direction in which said bar 13 extends. In the absence of a mounting on a pivoting plate 18, the bar 13 would then be offset in a movement that would come close to the rotor 10 and therefore would be difficult to carry out.

Alternatively, it is possible to envision a sealing bar 13, extending transversely in the direction of advance of the film and therefore parallel to the rotor 10, and detachable by translation parallel to the axis of this rotor 10.

In possible embodiments, the loader has a means 14 for attachment by magnetization to hold a portion of the free end of the reserve film 8 on the periphery of the rotor 10. It can be a matter of, for example, a pair of thin strips, pulled toward one another by magnetization and between which the end of the reserve film 8 comes. This attachment means 14 is positioned on the periphery of the rotor 10. It may be removable to be placed on the reserve film 8 where the latter is located. Alternatively, the attachment means 14 can be stationary in relation to the rotor 10, and it is then the reserve film 8 that will be placed where the attachment means 14 is located, on the periphery of the rotor 10.

The invention also has as its object a machine that uses such a device, namely a machine for packaging by plastic-wrapping, comprising a belt conveyor on which are located products to be coated, a coating module within which the products are coated with film, as well as a thermal contraction furnace into which the coated products subsequently travel, with said machine comprising, for its feed with film, a delivery device 1 as described above.

Such a machine also comprises the traction module 15 that makes it possible to pull the film downstream. A buffer that is set up by movable axes around which the unwound film 6 rolls up is preferably located downstream from the return roller 5. The tension of the unwound film 6 is regulated between, on the one hand, the traction force of the traction module 15, and, on the other hand, the controlled rotation of the corresponding roll.

The invention also has as its object a method using the device as described above, namely a method for delivery by film of a machine for packaging by plastic-wrapping, with said method comprising steps consisting essentially in Sending a film, a so-called unwound film 6, from a roll, a so-called unwound roll 7, against a return roller 5, Swapping-out a roll to continue to deliver a film from another roll, until then a reserve roll 9, and, for this purpose, stopping the unwound film 6 and connecting it to the film, so-called reserve film 8, of said reserve roll 9. As has already been mentioned, the bond between the two films can be made by thermal welding.

According to the invention, the method comprises a loading step, essentially consisting in making a rotor 10 rotate on the periphery of which an end part of the reserve film 8 is held, in such a way as to roll up the reserve film 8 around said rotor 10 and then to bring it close to the unwound film 6 to connect them.

The unwound film is locked downstream at the return roller 5, in such a way that the handling linked to the swapping-out of the roll and that takes place upstream from the return roller 5 is done without degrading the state of tension from the side of the plastic-wrapping station. Once the films are connected, the portion of the unwound film 6 that is upstream from the weld is disconnected from the traction module 15 by tearing caused by the rolling-up of the unwound roll 7. The same holds true for the portion of the reserve film 8 that is downstream from the weld. Thus, the traction module 15 is connected to the rest of the unwound film 6, and then, connected to it, to the reserve film 8.

According to a possible additional characteristic, the reserve film 8 is connected to the unwound film 6 by being welded to one another against the rotor 10. Thus, the fact of coating the reserve film 8 in a maximum layer on the rotor makes it possible not only to bring it close to the unwound film but also to take it onto a complementary surface against which pressure can be exerted upon welding, by an element of the sealing-bar type 13.

According to another possible additional characteristic, the reserve film 8 is connected to the unwound film 6 by being welded to one another in the area of at least two successive welding beads in the direction of travel of the film. This is carried out by making the rotor 10 rotate, moreover, which has the effect of bringing another portion of the film pair for a welding. The advantage of creating such a double weld is that the driving of the reserve film 8 by the unwound film 6 is safer, since the hold is more solid. In addition, at least one of the welding beads is not weakened by the tearing of film segments that should no longer be sent toward the traction module 15.

According to another possible additional characteristic, the method comprises a step consisting essentially in disengaging the unwound roll 7, by driving it in a rotational motion that tends to break the unwound film 6, upstream from the weld, and preferably also the reserve film 8, downstream from the weld. This is possible since the support shaft 3, on which the unwound roll 7 is mounted, is secured to a motor.

Finally, according to another possible additional characteristic, the method comprises a step for preparation of the swapping-out, during which the rotor 10 is rotated until presenting, at the top, an attachment means 14 with which it is provided to hold the reserve film 8. This holding in position can be executed with a removable or non-removable attachment means 14.

In the embodiment illustrated in the accompanying figures, the delivery device 1 can alternate in an automatic and autonomous way between two film rolls, which means that the machine is fed by turns by the delivery device 1 with one or the other roll. For this purpose, it is provided with two support shafts 3, each for accommodating a film roll. In absolute terms, multiple such motorized shafts could be considered.

By turns, the film used within the machine in the downstream plastic-wrapping station is the one provided by the roll of one of the support shafts 3 and then by the roll of the other shaft 3. Of course, configurations with more than two rolls are possible. In general, the next film is attached to the film in progress, with the latter then being separated from its feed roll.

The film fed by the rolls is sent toward the coating module per se by a return roller 5, which therefore forms the exit point of the delivery device 1. This return roller 5 takes the form of a rotary shaft, against which the film travels, regardless of the roll from which it is pulled.

A guide 4 is associated with each support shaft 3 in such a way that the film that is unrolled from the roll mounted on said support shaft 3 travels over this guide 4 and then under the intake roller of the return roller 5. This guide 4 preferably takes the form of a shaft, which ensures travel independently of the size of the roll. Regardless of the diameter of the unwound roll 7, the unwound film 6 therefore always passes against the film guide 4, which makes it possible to ensure that the film always passes though the same location, independently of the remaining quantity of film.

Figure 1:
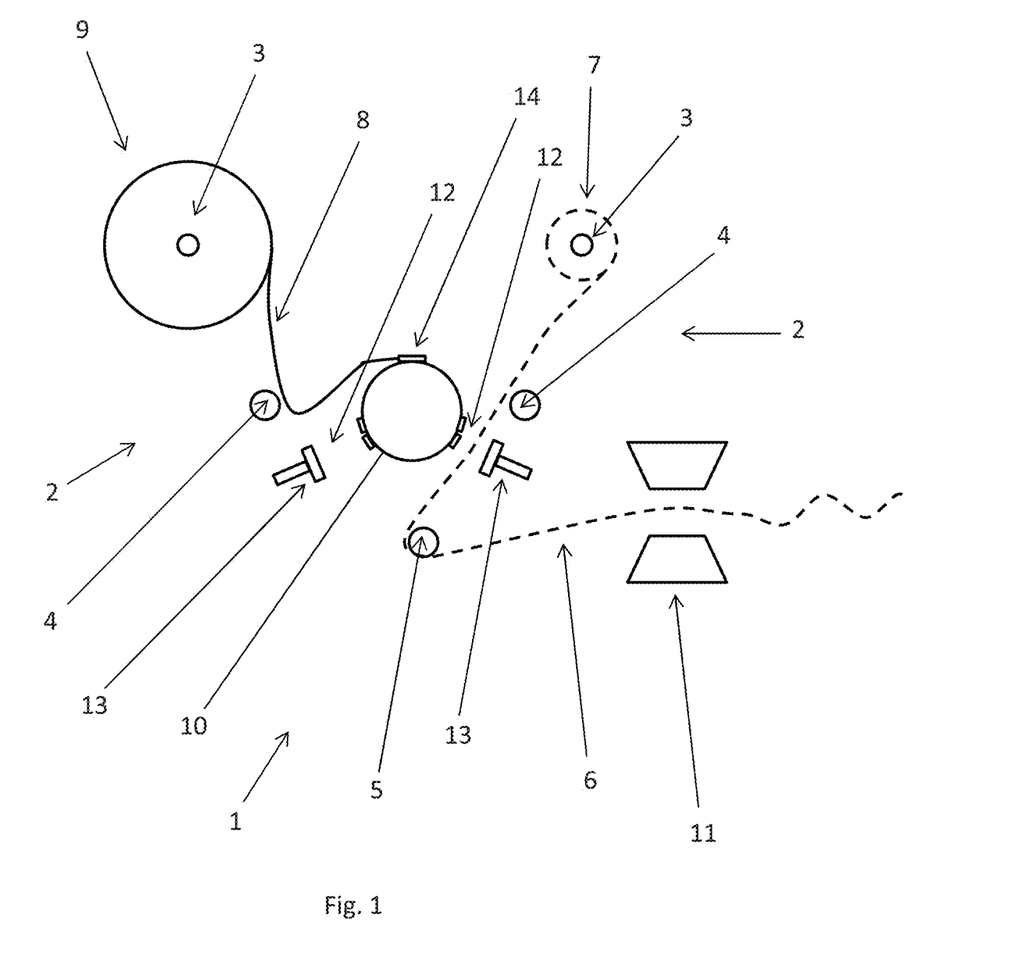
FIG. 1 shows a delivery device with a reserve roll that is ready to be used.

Thus, as FIG. 1 shows, the film being fed leaves its roll, travels above the associated guide 4, then travels around to just below the return roller 5, and then continues its path in the machine toward the station in which it is cut, and is then rolled up around products grouped into a lot on a belt conveyor.

The film fed into the machine is named unwound film 6, and the associated roll is then called an unwound roll 7. The at least one other roll, on stand-by, is named a reserve roll 9.

The method for swapping-out between the unwound roll 7 and the reserve roll 9 will now be described.

So as to ensure the continuity of the film feed of the plastic-wrapping machine, the reserve film 8 is connected mechanically to the portion of unwound film 6 that is driven into the machine. By then separating this portion of the unwound roll 7, the traction by the machine will have the effect of drawing said portion, and, leaving, the reserve film 8 to which it is connected. The machine is then fed with what was previously the reserve roll 9.

More specifically, the plastic-wrapping machine is equipped with a table into which the unwound film 6 is pulled. Upstream, the unwound film 6 travels in a dummy made up of rollers that are parallel and transverse to the advance of the film and that can move between one another under the action of the tension of the film that travels from one to the other by coating them. The return roller 5 is also located upstream. In addition to the suction by the downstream table, the reel 2 is preferably motorized and can therefore drive in rotation the roll that it supports, and this in the direction of rolling up or unrolling the film. The tension of the unwound film 6 downstream from the unwound roll 7 is thus controlled by the combination, on the one hand, of the rotation of the unwound roll 7, and, on the other hand, the traction of the table, with the dummy between them forming a buffer zone in which the tension of the film is preserved by elastic resistance of the buffer, by spring or counterweight, etc.

The traction module 15 therefore comprises the table and the dummy, with the tension of the film also depending on the controlled rotational motion of the reel 2 carrying the unwound roll 7.

Figure 2:
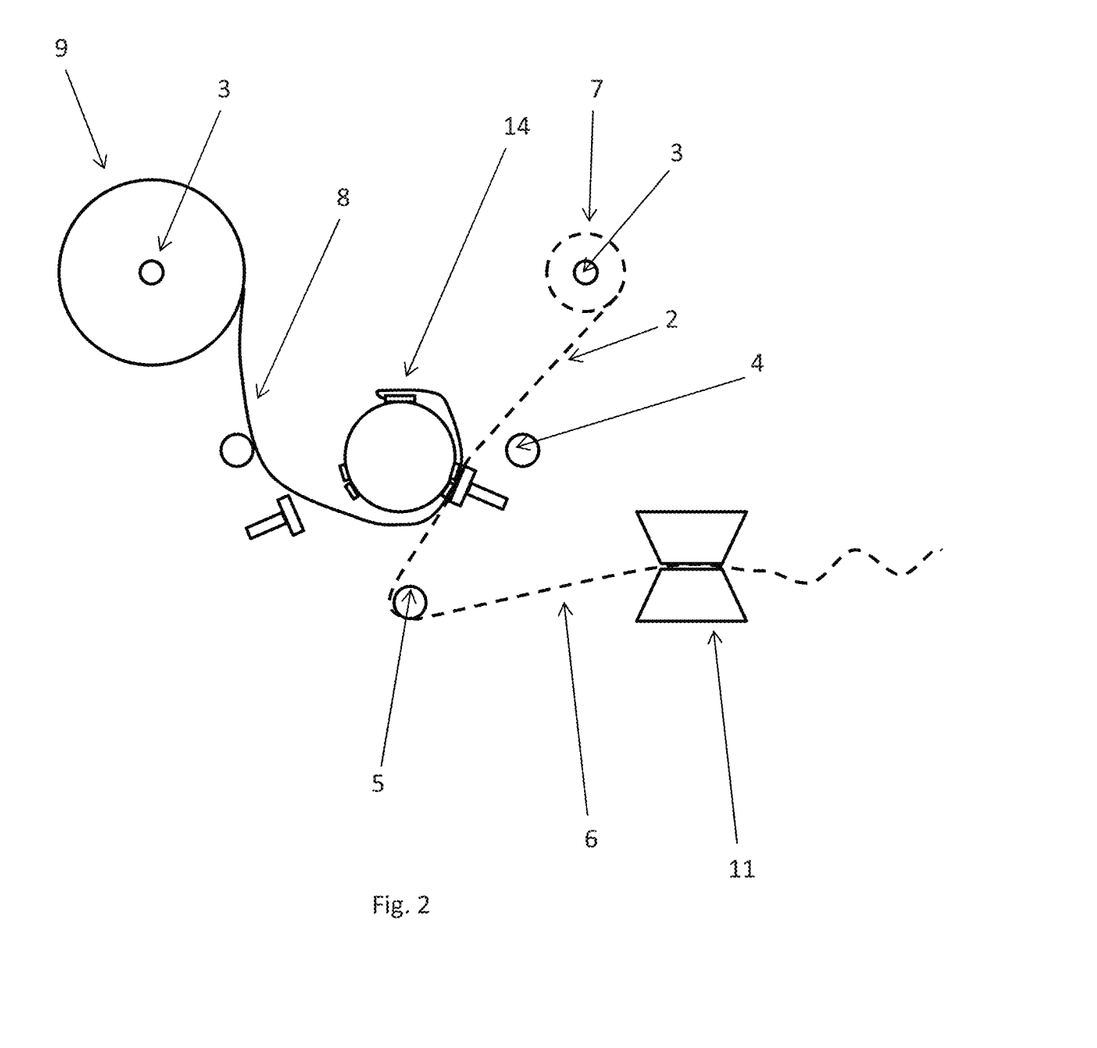
FIG. 2 shows in diagram form the coordination between the unwound film and the reserve film.

FIGS. 1 and 2 show the situation, on the right, of an unwound roll 7 that feeds the machine. The unwound film 6 therefore extends between the unwound roll 7 and the return roller 5, until farther into the machine. When necessary, since the unwound roll 7 is almost empty, or simply when desired, for a change in film pattern, for example, the film feed of the machine is stopped, which means that the unwound film 6 is no longer pulled into the machine.

To do this, the unwound roll 7 is gradually stopped, and the traction module 15 is optionally stopped based on the capacity of the buffer that separates them, and the unwound film 6 therefore no longer advances. A locking means 11 is then used to lock the unwound film 6 between the unwound roll 7 and the module that uses the film, or traction module 15, with the downstream tension being preserved. The unwound roll 7 is then slightly unrolled to reduce the tension of the unwound film 6, to prevent a welding under tension, which is then likely to lead to a tearing. The upstream portion of the unwound film 6 is then ready to be connected to the reserve film 8.

Note that in the particular cases of a pattern film that repeats regularly to appear at a predefined position on the group of products to be plastic-wrapped, it is important to stop the unwound film 6 at a controlled position. The weld is then made between two successive patterns, which also makes it possible to maintain the repetition regularity. The machine then comprises a detection cell that identifies the position of the downstream pattern of the return roller 5. The unwound roll 7 can be driven by rolling-up or unrolling to obtain the expected position of the unwound film 6 in the welding station 12. In this type of configuration, it is also important to control the reserve film 8 and to ensure that it is correctly positioned in the loader so that the weld is not located on its own patterns.

To bring the reserve film 8 closer to the unwound film 6, the delivery device 1 comprises a rotor 10 or loader, which forms a film movement means, bringing the reserve film 8 from a position where the manual loading is easy to be close enough to the unwound film 6 so that they are connected.

The reserve roll 9 is preferably prepared and brought into the delivery device 1 before it is necessary to change the film. The reserve roll 9 is placed on the corresponding support shaft 3, and then the end of the reserve film 8 is brought into an attachment means 14 that comprises the loader of the reserve film 8 or rotor 10.

Figure 5:
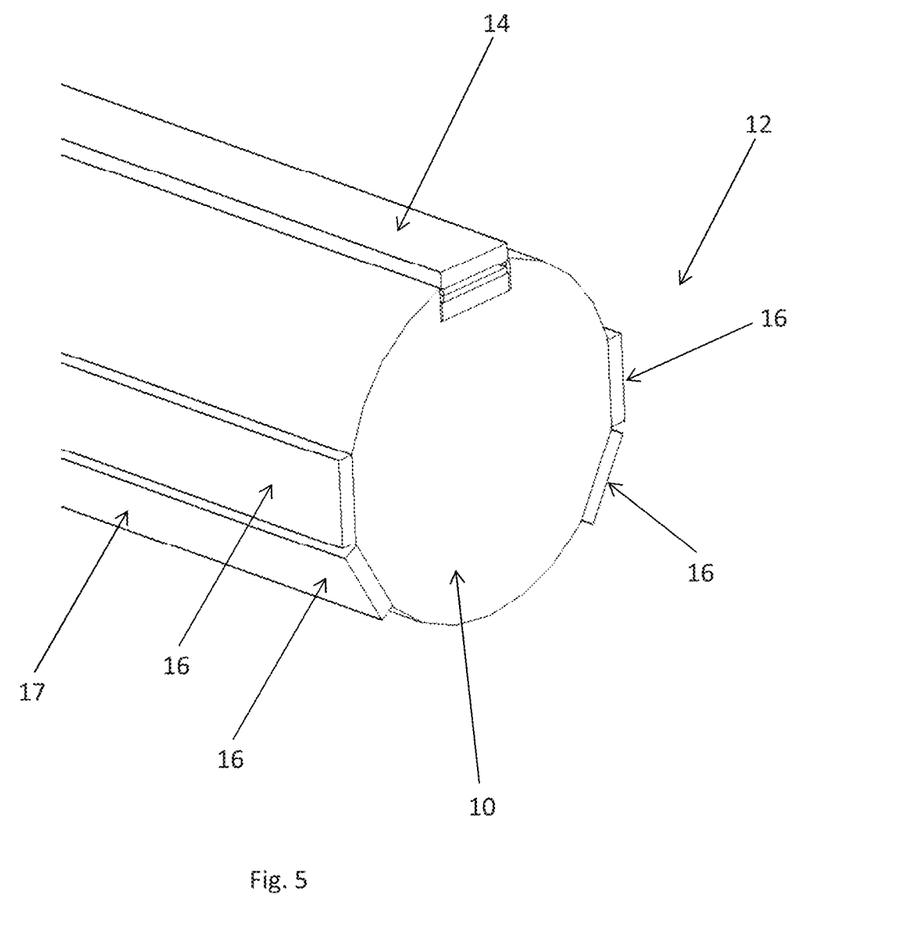
FIG. 5 shows a rotor, receiving surfaces, and a means for attachment.

This attachment means 14 can operate on the basis of a clamp or vise principle, for example with a loader that is equipped with a peripheral receiving surface, on which the reserve film 8 can be placed, where a thin strip is then flattened by magnetism against the loader, so that the end of the reserve film 8 is taken between the loader and said thin strip. In FIG. 5, the loader has a rotor 10 in the form of a cylinder with a metal base. Preferably, the cylinder is made of aluminum, with peripheral housings for receiving the attachment means 14, which then essentially takes the form of two thin strips magnetically working against one another, and between which the reserve film 8 can be taken. The rotor itself is therefore not necessarily magnetic. The end of the reserve film 8 is placed on the periphery of the rotor 10, and at least one magnetized metal part is applied so that the reserve film 8 is attached against the rotor 10 and the rotation of the latter entrains the reserve film 8. In this stage, only the end of the reserve film 8 is against the rotor 10.

The positioning of the end of the reserve film 8 in the attachment means 14 is preferably executed by an operator. The rotor 10 is positioned so that when the reserve film 8 is to be deposited on the rotor 10, the attachment means 14 is at the top, and therefore easily accessible for the operator. It will be noted that the mounting of the end of the reserve film 8 in the attachment means 14 is done with the same method regardless of the position of the new roll.

Thus, the attachment means 14 can be attached permanently in the rotor 10, and the reserve film 8 should then be brought there. Alternatively, the attachment means 14 can be removable and momentarily withdrawn from the rotor 10: it is then possible in a very ergonomic way to place the reserve film 8 in the attachment means 14, where said film is located, and then to position the attachment means 14 on the rotor 10 subsequently.

Bringing the reserve film 8 to the attachment means 14 is generally executed before stopping the unwound film 6. An operator can be responsible for the delivery and installation of the at least one reserve roll 9. A piece of robotic equipment can also be provided for bringing the at least one reserve roll 9.

Once the end of the reserve film 8 is placed against the rotor 10 or loader and firmly held against it by the attachment means 14, said rotor 10 starts a rotational motion. The reserve film 8 then rolls up around the rotor 10, and the reserve roll 9 therefore unrolls very slightly. More specifically, the reserve roll 9 is preferably first of all unrolled enough so that the subsequent rotation of the rotor 10 does not cause an uncontrolled rotation of the reserve roll 9. Once the rotor 10 and the reserve film 8 are in position for a weld, the reserve roll 9 is rolled up to re-tighten the reserve film 8, without, however, exceeding a tension threshold starting from which the weld can be accompanied by a tearing of the film, with the reserve roll 9 then being, for example, slightly unrolled after the roll-up torque has reached a predefined threshold.

Preferably, the rotor 10 carries out just enough rotation so that a single layer of reserve film 8 arrives close to the unwound film 6 and the rotor 10 is not covered by more than one layer. The rotor 1 can be driven by a rotary jack with an amplitude that is less than one complete turn.

The loader entrains the reserve film 8 in such a way that it arrives in the immediate environment of the unwound film 6. The proximity of the reserve film 8 and the unwound film 6 then makes possible a weld between them, as described below.

The reserve film 8 is brought into the immediate environment of the unwound film 6 because the peripheral surface of the rotor 10 passes close to the unwound film 6 when the former extends between the return roller 5 and the unwound roll 7, and the reserve film 8, under the action of the rotation of the loader or rotor 10, rolls up against this outer peripheral surface of the rotor 10.

After the rotation of the loader or rotor 10, the unwound film 6 and the reserve film 8 are therefore at least locally close to one another, in a zone where they can be easily connected to one another. The loader moves the reserve film 8 so that it is close to the unwound film 6, in an action zone of a welding station 12. The rotation of the rotor 10 not only has the effect of bringing the reserve film 8 close to the unwound film 6 in a welding zone, but also of bringing the reserve film 8 into said welding zone, i.e., opposite a movable sealing bar 13, and against a complementary surface in the area of the rotor 10.

The following operation then consists in carrying out a thermal weld for connecting the two films together. To do this, the two films, in the zone where they are close, are brought into contact with one another simultaneously with a heat input. In a preferred way, as the figures show, the two films are pushed against the rotor 10 by a heating element or a sealing bar 13, which has the effect that the two films are in contact with one another and under the action of a heat input and are thus welded thermally to one another. A sealing bar 13 is therefore associated with each reel 2: one on the left and one on the right in FIGS. 1 and 2.

The sealing bar 13, moved in the direction of the rotor 10, thus has the effect of bringing the unwound film 6 against the reserve film 8, itself against the rotor 10. The sealing bar 13 is equipped with suitable heating means.

Of course, the rotation of the rotor 10 or loader that has had the effect of rolling up the reserve film 8 around it has an amplitude such that the rotor 10 offers—opposite the sealing bar 13—a surface that accepts the heat input and the contact, and even the pressure of the sealing bar 13. The rotor 10 thus has at least one receiving surface 16 on its periphery or circumference, against which the sealing bar 13 can come in such a way as to produce the weld between the two films. This receiving surface 16 is preferably flat, which increases the surface that is available for the weld, whose resistance generally varies with the size.

In this stage, traction on the film, exerted by the plastic-wrapping module, would then have the effect of bringing, from this weld where the two films are connected, as much of the unwound film 6 connected to the unwound roll 7 as the reserve film 8 connected to the reserve roll 9. After this welding, it is therefore necessary to separate the unwound roll 7 from the driving of the machine.

In a preferred way, it is when the two films are taken together against one another between, on the one hand, the rotor 10, and, on the other hand, the sealing bar 13, that the unwound roll 7 is put into rotation in the direction opposite that of the feed. By this rotation, the portion of unwound film 6 between the unwound roll 7 and the weld is separated from the latter. Since the unwound film 6 is hot on the occasion of the welding, the traction that the inverse rotation of the unwound roll 7 exerts has the effect of breaking the unwound film 6 in the area of the weld. The weld and the traction of the unwound roll 7 also have the effect of separating from the weld the segment of reserve film 8 rolled up around the rotor 10 between said weld and the attachment means 14. The unwound roll 7 is then connected, thanks to this weld, to a segment of reserve film 8, attached to the attachment means 14, that it is then enough to release. The reserve roll 9 is connected, thanks to this weld, to a segment of unwound film 6 that arrives at the fed station or traction module 15.

The unwound roll 7 is rolled up to test the mechanical strength of the weld by a measurement of the resistive torque associated with the rolling-up rotation. The opening of the welding station 12 is controlled since the associated resistive torque does not drop below a predefined low threshold, which would represent a tearing. In the event that welding is detected by a lowering and even a dropping of the torque that is resistive to the rolling up, the welding station 12 remains closed, and a malfunction procedure is executed.

After opening the welding station 12 and releasing the unwound film 6 and the reserve film 8 then welded together, the weld can be cooled by a jet of air sent by a blowing means 19 mounted on the plate 18. It may involve two nozzles close to the transverse ends. This makes it possible to accelerate the swapping-out procedure and to make the machine operational earlier.

When the sealing bar 13 moves away from the rotor 10, the films held until then are, of course, released and can again be driven and fed into the machine. The other part, between the attachment means 14 and the unwound roll 7, then stopped, is simply taken off.

After the unwound film 6 breaks in the area of the weld under the action of the inverse rotation of the unwound roll 7, the plastic-wrapping module of the machine is fed by the succession of a portion of unwound film 6, connected to the reserve film 8 and therefore to the reserve roll 9. In this stage, the succession of the two films is therefore ready to be sent downstream into the machine, pulled by the traction module 15.

Once the machine is activated, after release of the locking means 11, the segment of unwound film 6 is absorbed, and then the reserve film 8. It is understood that at this stage, the film, previously called "reserve" film, becomes unwound film 6.

It is then possible to simply release the rest of the roll that was the unwound roll 7 from its support shaft 3.

As FIG. 2 shows, the configuration of the delivery device 1 is such that the return roller 5 is located more or less opposite the rotor 10, or loader, in particular placed vertically above one another. A configuration where the return roller 5 and the two film guides 4 are positioned so that films traveling successively on them are in mirror image to one another in relation to a vertical axis is preferred. The return roller 5 can be slightly offset in relation to the rotor 10. One of the reels 2 is then located beside the rotor 10—return roller 5 axis, and the other is located on the other side. It is conceivable to have multiple reels 2, with a film guide 4 optionally being common to multiple reels 2. Having more than two reels 2 makes it possible to increase the autonomy of the machine. It is also conceivable to provide a controlled means for bringing to the rotor 10 the free end of the reserve film 8 to be used, optionally the attachment means 14 to which it is secured.

The unwound film 6 therefore travels from the unwound roll 7 to the return roller 5 between the rotor 10 and the sealing bar 13, the latter together forming a welding station 12.

Preferably, a sealing bar 13 is associated with each reel 2, in such a way as to be able to weld a reserve film 8 to the film discharged by the roll mounted in said reel 2, then forming respectively the unwound film 6 and the unwound roll 7. The sealing bar 13 is movable in the direction of the rotor 10 and forms, with at least one portion of the peripheral surface of the latter, a welding station 12 for connecting together the film in the process of being fed by the roll that is associated with said sealing bar 13, and the film from another roll, then forming the reserve film 8.

After the rotor 10 has carried out the rotation that is necessary for bringing the reserve film 8 that is attached to its periphery in the immediate environment of the unwound film 6, in the area of the welding station 12, the sealing bar 13 is brought close to the rotor 10 until pressing together the two films against the rotor 10 and attaching them to one another under the action of the heat generated by said bar.

Preferably, the inverse motion of the unwound roll 7, whose purpose is to break the unwound film 6 into a part connected to the machine and to the reserve film 8 and another part connected to the unwound roll 7, is at least begun and even completely executed before the sealing bar 13 is moved far enough away from the rotor 10 to make possible a release of the two films that are then welded.

The figures illustrate the case of a swapping-out between an unwound roll 7 on the right and a reserve roll 9 on the left. The directions of rotation of the rotor 10 are inverse for inverse swapping-out. The reserve film 8 is attached to the top of the rotor 10. Then, the rotor 10 is rotated in the opposite direction of the hands of a clock, in such a way that the reserve film 8 no longer forms a layer on the periphery of the rotor 10 and it covers by a single layer the part of the surface of the rotor 10 against which the sealing bar 13 comes for connecting together a layer of unwound film 6 that is then stopped, and a layer of reserve film 8.

So as to reinforce the attachment between the two films, it is conceivable to initiate multiple successive attachments between the films, in particular two. In the embodiment described below, the one performed in the second is carried out, in relation to the first, from the side of the free end of the reserve film 8.

Thus, a first welding is carried out as was already described. However, after this welding, the unwound film 6 is not torn in the area of the welding with an inverse movement of the unwound roll 7. After releasing the sealing bar 13, the rotor 10 is rotated in such a way as to bring opposite said bar a reserve film zone 8 that is located between the previously executed weld and the free end held in the attachment means 14. A rotation by a 30-degree angle can, for example, be executed. In the same reference point as previously, this rotation is executed in the clockwise direction, i.e., in the inverse direction from the one used to bring the reserve film 8 against the unwound film 6. This rotation is carried out with a monitoring of the tension of the films and can, for example, be accompanied by a suitable rotation of the rolls: the unwound film 6 is pulled from the unwound roll 7, and the reserve film 8 is pushed toward the reserve roll 9.

Once a new portion of reserve film 8 is put opposite the sealing bar 13, with a new portion of unwound film 6, the sealing bar 13 can again initiate its motion to approach the rotor 10 until the two films are bonded together by heat sealing.

It will be understood that carrying out multiple welding operations is very easy, since it is enough to initiate again an opening of the welding station 12, a rotation of the rotor 10, and a closing of the welding station 12. The unwound film 6 is torn in the area of the last desired weld thanks to the traction rotation of the unwound roll 7. This rotation begins, and is even completely executed, before the sealing bar 13 sufficiently releases the rotor 10 to make it possible for the films to move.

Such a second weld thus bonds, in relation to the first, a zone of the unwound film 6 that is more upstream and therefore further toward the unwound roll 7 to a zone of the reserve film 8 that is more downstream and therefore further toward the free end. The reserve film 8 and the unwound film 6 are then connected with two successive welding beads, transverse in relation to the direction of travel. Such a succession of welds makes it possible to ensure a good continuity of the film sucked in by the machine, which therefore considerably reduces the risk of poor concatenation during the reactivation time. If the attachment between the portion of unwound film 6 still in the machine and the reserve film 8 to follow is too weak, it runs the risk of breaking upon restart. It is then necessary to begin the initial loading maneuver again.

The advantage of carrying out multiple welds is that there is at least one weld that is not embrittled by the disconnection of the unwound roll 7 by tearing. In other words, the separation of the unwound film 6 in the area of the weld is done without impairing the quality of the hold.

Once the reserve film 8 is connected to the unwound film 6, and the latter is torn in such a way as to no longer connect the unwound roll 7 to the intake of the machine, the locking means 11 can be opened, which then makes it possible for the machine to pull the remaining portion of the unwound film 6, and then the reserve film 8 is connected to said portion in the area of the weld thereof.

In other embodiments, the reserve film 8 is connected to the unwound film 6 by being welded by a first welding bead, and then by making the rotor 10 rotate again in the same direction of travel as the one used for the rolling-up of the reserve film 8 around the rotor 10, and the reserve film 8 is connected to the unwound film 6 by being welded by a second welding bead.

Thus, a first weld, as has already been described, is produced. Before making the first weld, a film pull is activated to create a film reserve. This film pull optionally takes the form of a bar on which a jack is mounted on each end, and the bar of the film pull has the function of pushing the film and thus creating a film reserve. Of course, other embodiments could be considered. This film pull is placed between the locking means 11 and the unwound roll 7. Once the first weld is made, the film pull is released, and the rotor 10 is rotated again in the same direction of travel as for the installation of the reserve film 8 for the production of the first weld, in other words, in the same direction of travel as the one used for the rolling-up of the reserve film around the rotor 10. This rotation can, for example, be approximately 30 degrees. Then, the second weld is made, with the sealing bar 13 coming toward the rotor 10 for heat-sealing the two films. Finally, the unwound roll 7 is rolled up to break the film in the area of the second weld.

The first weld contributes to bonding the two films to one another, i.e., the unwound film 6 and the reserve film 8. The second weld contributes to locating the break between the two films. In addition, it is understood that with such a direction of rotation of the rotor 10 between the two welds, only one of the two is driven in the machine downstream during the resumption of production. The first weld of the two to be carried out is actually separated from the film that will be provided to the machine subsequently. The separation between the films, namely the one from the machine and those from the welding zone to, respectively, each of the two rolls, is done in the area of the second weld of the two to be produced.

Figure 4:
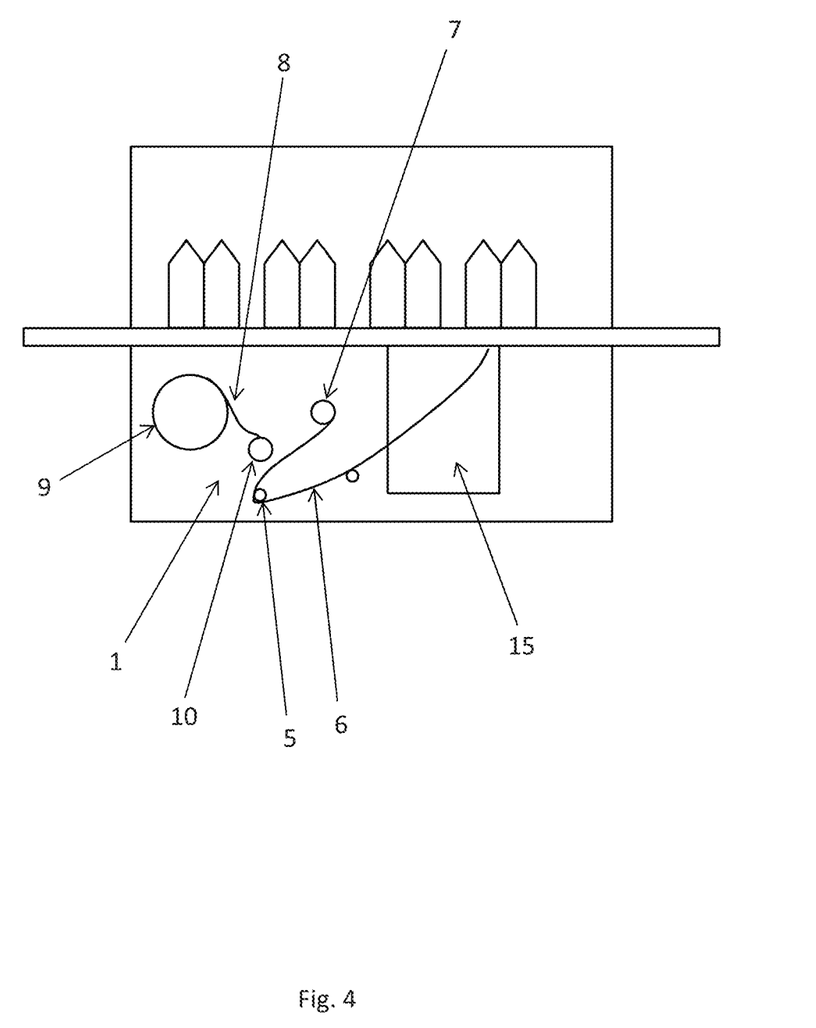
FIG. 4 is an overall view of the machine according to the invention.

FIG. 4 illustrates a machine for packaging by plastic-wrapping. It comprises a belt on which are placed products to be coated with film. The film is generally fed through the bottom of the belt. The delivery device 1 is then positioned under the belt. A traction module 15 pulls the film then to cut it to the required length and then to send it to coat the products above the belt. Connecting together the end of the reserve film 8 with the film 6 that is unwound and therefore pulled by the traction module 15 makes it possible to avoid the step of loading a new film into the traction module 15.

The reels 2 are essentially transverse to the direction of advance of the products, with the loader or rotor 10 being located between the support shafts 3, on the one hand, and the return roller 5, on the other hand.

FIG. 5 shows a cross-section of the end of the rotor 10. It is provided with an attachment means 14 in the upper part, for holding the free end of the unwound film 6. This attachment means 14 takes the form of a pair of plates or thin strips, between which is taken said end and which is housed in a groove of the rotor 10 provided for this purpose. To attach a reserve film 8 ergonomically, the rotor 10 is positioned so that the attachment means 14 is in the top part or at least accessible for an operator.

The rotor 10 also has, facing one another, two cooperating zones 17 with one sealing bar 13 in each case. Each zone is therefore there for the attachment of another film to the film provided by the roll mounted on the reel 2 in the extension of said zone when the rotor 10 is at rest with the attachment means 14 upward. A zone 17 can comprise two thin strips 16 against which the sealing bar 13 can rest, with each flat thin strip being designed for one of the successive welds to be produced and forming a receiving surface 16. The fact of having the flattest zone 17 possible increases the size of the weld and therefore its mechanical strength.

The receiving surface 16 can take the form of a flat thin strip made of silicone, for example.

Figure 3:
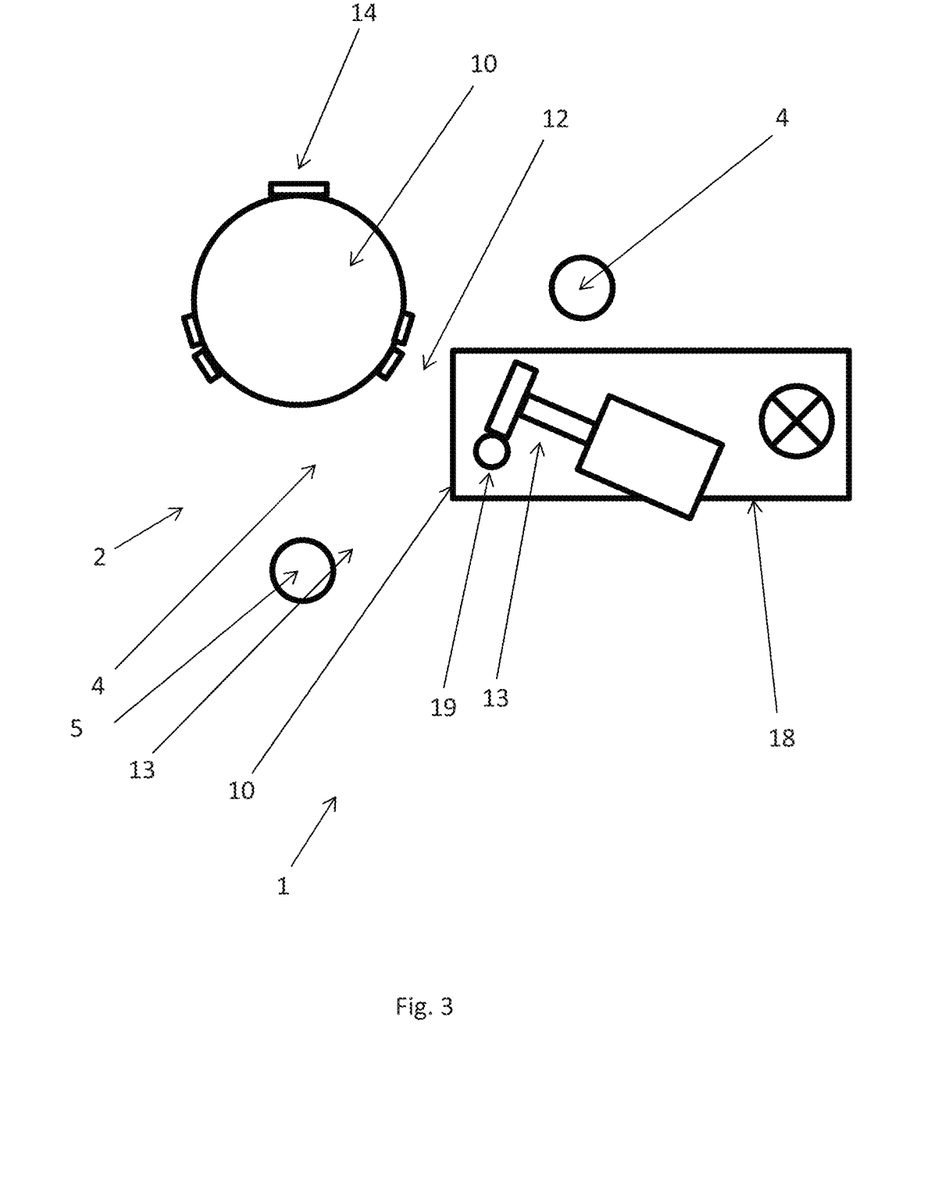
FIG. 3 shows a detail of the delivery device, in particular the mounting of a sealing bar.

As FIG. 3 shows, so as to allow easy access and maintenance, each sealing bar 13 is preferably mounted with, at its ends, a pivoting plate 18 around a fixed axis in the machine and parallel to said bar. By the pivoting of plates, the sealing bar 13 is then moved away from the rotor 10 and made more accessible to an operator. In addition, the sealing bar 13 can preferably be detached in relation to these plates 18 and can preferably be plugged into there in a motion parallel to the axis of the rotor 10. Thus, for maintenance that can be the changing of the sealing bar 13, it is sufficient to pull the sealing bar 13 in question out of the delivery device 1, and then to slide another by translation parallel to the axis of rotation and therefore transverse to the advance of the film. The pivoting of the plates 18 can then be used to release the sealing bar 13 and/or to provide access to the peripheral surface of the rotor 10, in particular the one against which the sealing bar 13 normally comes.

Although the accompanying figures illustrate the case of two reels 2 that face one another, it is conceivable that the delivery device 1 contains more than two reels 2. In this type of configuration, the guide 4 can be common to multiple support shafts 3.

Relative to the operation of the delivery device 1, at least one reserve roll 9 can be loaded without waiting for the end of the unwound roll 7, and this by an operator or by a machine.

Thanks to the invention, it is thus possible to obtain a device 1 for delivery of film to a plastic-wrapping machine that has a high level of autonomy, as well as good ergonomics and a high ease of use.

Although the description above is based on particular embodiments, it is in no way limiting of the scope of the invention, and modifications can be provided, in particular by substitution of equivalent techniques or by a different combination of all or part of the characteristics developed above.

The invention claimed is:

1. Delivery device (1) for delivery of film for packaging products by plastic-wrapping, said delivery device comprising:
at least two reels (2), each reel (2) comprising at least one support shaft (3) for a film roll as well as a film guide (4) of the film roll,
a return roller (5), up to which, during operation, an unwound film (6) travels, from an unwound film roll (7) of one of the reels (2);
a loader, for bringing close to the unwound film (6) the reserve film (8) from a reserve film roll (9) of the at least one other reel (2),
wherein:
the loader comprises a rotor (10) having two cooperation zones (17) facing each other positioned thereon, each cooperation zone (17) comprising a sealing bar (13) and two flat strips (16) forming a receiving surface (16),
the rotor (10) is configured to roll up the reserve film (8) around the rotor (10) to position the reserve film (8) near the unwound film (6) and receive the sealing bar (13) for joining each of the two flat strips (16) at or near the receiving surface (16),
the rotor (10) is configured to rotate the reserve film roll (9) in the same direction of travel as the unwound film roll (7), and
the reserve film (8) is connected to the unwound film (6) by at least two successive welds on the receiving surface (16), said welds being transverse to the direction of unwinding of the unwound film (6).

2. Delivery method according to claim 1, wherein the rotor (10), the return roller (5) and the reels (2) are placed such that a periphery of the rotor (10), on which the reserve film (9) rolls up, extends close to the unwound film (6), in a zone between the guide (4) of the reel (2) of the unwound film roll (7) and the return roller (5).

3. Delivery device according to claim 1, wherein the at least two reels (2) face one another,
the rotor (10) and the return roller (5) being opposite one another, and
the rotor (10) and the return roller (5) being mounted between the at least two reels (2).

4. Delivery device according to claim 1, wherein said welding station (12) comprises two jaws between which the unwound film (6) and the reserve film (8) are taken, between one of the jaws being formed by the periphery of the rotor (10) and the other of the jaws being placed opposite relative to the rotor (10).

5. Delivery device according to claim 4, wherein the jaw opposite the rotor (10) takes the form of a heating sealing bar (13), movable in the direction of the rotor (10), the heating sealing bar (13) pressing the unwound film (6) and the reserve film (8) together against the rotor (10).

6. Delivery device according to claim 4, wherein the jaw opposite the rotor (10) is interchangeable and detachable.

7. Delivery device according to claim 1, wherein the loader has a means (14) for attachment by magnetization to hold a portion of the free end of the reserve film (8) on the periphery of the rotor (10).

8. Packaging machine for packaging products by plastic-wrapping, comprising a belt conveyor on which are located products to be coated, a coating module within which the products are coated with film, as well as a thermal contraction furnace into which the coated products subsequently travel, wherein said packaging machine comprises, for its feed of film, a delivery device (1) according to claim 1.

9. Delivery method for delivery of film of the packaging machine for packaging products by plastic-wrapping according to claim 8, comprising:
sending an unwound film (6), from an unwound film roll (7), against a return roller (5),
roll swapping-out a roll to continue to deliver a reserve film from another reserve film roll (9), comprising stopping the unwound film (6) and connecting the unwound film (6) to the reserve film (8) of said reserve film roll (9), and
a loading step comprising making a rotor (10) rotate on a periphery of which an end part of the reserve film (8) is held, in such a way as to roll up the reserve film (8) around said rotor (10), and then bringing the reserve film (8) close to the unwound film (6) to connect the reserve film (8) and the unwound film (6) together.

10. Delivery method according to claim 9, wherein the reserve film (8) is connected to the unwound film (6) by being welded one to the other against the rotor (10).

11. Delivery method according to claim 10, wherein the reserve film (8) is connected to the unwound film (6) by being welded the reserve film (8) is connected to the unwound film (6) by being welded by the first bead, and then by making the rotor (10) rotate in the direction of travel as the reserve film (8) around the rotor (10), and the reserve film (8) is connected to the unwound film by being welded by the second welding bead.

12. Delivery method according to claim 10, further comprising
disengaging the unwound film roll (7), by driving the unwound film roll (7) in a rotational motion that tends to break the unwound film (6), upstream from the weld between the unwound film and the reserve film.

13. Delivery method according to claim 9, further comprising
preparing the roll swapping-out, during which the rotor (10) is rotated until having, at the top, an attachment means (14) hold holding the reserve film (8).

* * * * *